(12) United States Patent
Kumar et al.

(10) Patent No.: US 9,727,219 B2
(45) Date of Patent: Aug. 8, 2017

(54) MEDIA PLAYBACK SYSTEM CONTROLLER HAVING MULTIPLE GRAPHICAL INTERFACES

(71) Applicants: Abhishek Kumar, Santa Barbara, CA (US); Paul Bates, Santa Barbara, CA (US); Diane Roberts, Santa Barbara, CA (US)

(72) Inventors: Abhishek Kumar, Santa Barbara, CA (US); Paul Bates, Santa Barbara, CA (US); Diane Roberts, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 482 days.

(21) Appl. No.: 14/216,439

(22) Filed: Mar. 17, 2014

(65) Prior Publication Data

US 2014/0201635 A1 Jul. 17, 2014

Related U.S. Application Data

(60) Provisional application No. 61/792,751, filed on Mar. 15, 2013.

(51) Int. Cl.
*G06F 3/00* (2006.01)
*G06F 3/0484* (2013.01)
(Continued)

(52) U.S. Cl.
CPC ........ *G06F 3/04847* (2013.01); *G11B 19/025* (2013.01); *G11B 27/34* (2013.01);
(Continued)

(58) Field of Classification Search
CPC .............................. G06F 9/4443; G06F 3/0482
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
JP 2012022685 A 2/2012
(Continued)

OTHER PUBLICATIONS

International Search Report for PCT/US2014/030560 mailed Aug. 14, 2014.
(Continued)

*Primary Examiner* — Haoshian Shih
(74) *Attorney, Agent, or Firm* — McDonnell Boehnen Hulbert & Berghoff LLP

(57) ABSTRACT

Embodiments are described herein that provide a media playback system controller with multiple graphical interfaces. In one aspect, a method is provided that involves (a) causing a graphical display to provide a first graphical interface including at least (i) a first input region and (ii) a first representation of a media item, (b) receiving a first input data indicating a selection within the first input region, (c) based on the received first input data, causing the graphical display to provide a second graphical interface including at least (i) an active region, (ii) an inactive region, and (iii) a second representation of the media item, (d) receiving a second input data indicating a selection within the active region, and (e) based on the received second input data, causing the graphical display to provide one or more media playback controls.

22 Claims, 9 Drawing Sheets

(51) Int. Cl.

| | | |
|---|---|---|
| *G11B 27/34* | (2006.01) | |
| *H04N 5/445* | (2011.01) | |
| *H04N 21/432* | (2011.01) | |
| *H04N 21/436* | (2011.01) | |
| *H04N 21/472* | (2011.01) | |
| *H04N 21/482* | (2011.01) | |
| *H04N 21/485* | (2011.01) | |
| *H04N 21/81* | (2011.01) | |
| *G11B 19/02* | (2006.01) | |

(52) U.S. Cl.
CPC ..... *H04N 5/44543* (2013.01); *H04N 21/4325* (2013.01); *H04N 21/43615* (2013.01); *H04N 21/47217* (2013.01); *H04N 21/485* (2013.01); *H04N 21/4825* (2013.01); *H04N 21/8113* (2013.01); *H04N 2005/44556* (2013.01); *H04N 2005/44578* (2013.01)

(58) Field of Classification Search
USPC ..................................... 715/716, 764, 853
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,590,772 | B2 | 9/2009 | Marriott et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,291,349 | B1 | 10/2012 | Park et al. |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2008/0120647 | A1 | 5/2008 | Shin |
| 2010/0281369 | A1 | 11/2010 | Bell et al. |
| 2010/0299639 | A1 | 11/2010 | Ramsay et al. |
| 2011/0041056 | A1* | 2/2011 | Griffin .............. G06F 3/0237 715/708 |
| 2012/0249734 | A1 | 10/2012 | Takayama et al. |
| 2013/0211843 | A1 | 8/2013 | Clarkson |
| 2015/0078586 | A1 | 3/2015 | Ang et al. |

FOREIGN PATENT DOCUMENTS

| | | |
|---|---|---|
| JP | 2012032932 A | 2/2012 |
| JP | 2012215791 A | 11/2012 |
| KR | 20050014366 | 2/2005 |
| WO | 0153994 | 7/2001 |
| WO | 03093950 A2 | 11/2003 |
| WO | WO2009081390 | 7/2009 |

OTHER PUBLICATIONS

Written Opinion of the International Searching Authority for PCT/US2014/030560 mailed Aug. 14, 2014.

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000" May 2000, 138 pages.

International Bureau, International Preliminary Report on Patentability, mailed Sep. 24, 2015, issued in connection with International Application No. PCT/US2014/030560, filed on Mar. 17, 2014, 7 pages.

Anonymous: "Sonos Controller for Mac or PC Product Guide," https://web.archive.org/web/20130129172752/http://www.sonos.com/documents/produtcguides/EN/MacPCGuide_EN.pdf [retrieved on Mar. 1, 2016], Jan. 29, 2013, 107 pages.

European Extended Search Report mailed Mar. 8, 2016, issued in connection with EP Application No. 14762560.2, 7 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Jo J., et al., "Synchronized One-to-many Media Streaming with Adaptive Playout Control," Proceedings of SPIE, 2002, vol. 4861, pp. 71-82.

"UPnP; "Universal Plug and Play Device Architecture"; Jun. 8, 2000; version 1.0; Microsoft Corporation; pp. 1-54".

"U.S. Appl. No. 13/904,896, filed May 29, 2013, "Playback queue control via a playlist on a mobile device" Kumar et al.".

"U.S. Appl. No. 13/904,909, filed May 29, 2013, "Playback Queue Control Transition" Kumar et al.".

"U.S. Appl. No. 13/904,923, filed May 29, 2013, "Connected State Indicator" Kumar et al.".

"U.S. Appl. No. 13/904,932, filed May 29, 2013, "Moving a Playback Queue to a New Zone" Kumar et al.".

"U.S. Appl. No. 13/904,936, filed May 29, 2013, "Private Queue Indicator" Kumar et al.".

"U.S. Appl. No. 13/904,944, filed May 29, 2013, "Playlist Modification" Kumar et al.".

"U.S. Appl. No. 13/904,949, filed May 29, 2013, "Playback Zone Silent Connect" Kumar et al.".

"U.S. Appl. No. 14/194,257, filed Feb. 28, 2014, "Playback Zone Representations" Kumar et al.".

"Denon 2003-2004 Product Catalog," Denon, 2003-2004, 44 pages.

(56) References Cited

OTHER PUBLICATIONS

Japanese Patent Office, Japanese Office Action dated Jan. 31, 2017, issued in connection with Japanese Application No. 2016-503421, 8 pages.
U.S. Appl. No. 60/490,768, filed on Jul. 28, 2003, entitled "Method for synchronizing audio playback between multiple networked devices," 13 pages.
U.S. Appl. No. 60/825,407, filed on Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, Office Action dated May 4, 2017, issued in connection with Chinese Application No. 201480028052.8, 12 pages.
Sonos Controller for Mac or PC Product Guide, 2013, 111 pages.

\* cited by examiner

MEDIA PLAYBACK SYSTEM CONTROLLER HAVING MULTIPLE GRAPHICAL INTERFACES

RELATED APPLICATIONS

This application claims priority to U.S. Provisional Patent Application Ser. No. 61/792,751 filed Mar. 15, 2013, entitled Sonos Controller, which is incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
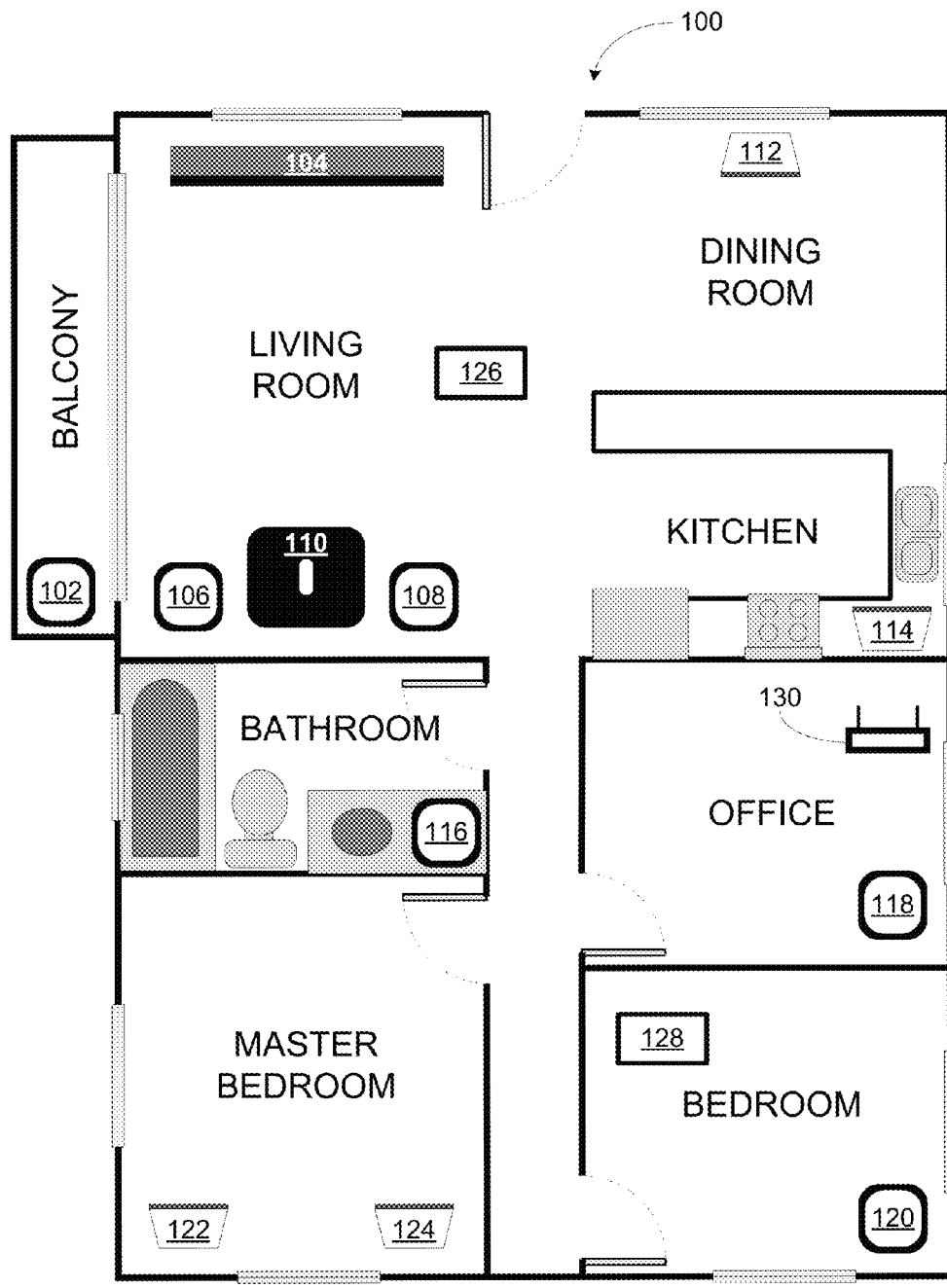
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

The playback of media items (e.g., songs, videos, etc.) has become an everyday activity for many people. A given system used to playback media may include a control device that controls playback of media items using the given media playback system. Embodiments described herein provide for, among other things, a media playback system controller having multiple graphical interfaces.

According to the present disclosure, a media playback system controller application ("controller") may be installed on a computing device (e.g., a computer, tablet, or smart phone, among other examples), and the computing device may be connected to a media playback system by way of a network (e.g., a WiFi network, among other examples). In such an arrangement, the controller may enable a user to control playback of media using the media playback system.

In certain contexts, it may desirable for the controller to provide multiple graphical interfaces to the user that each enable the user to control playback of media. For example, the controller may provide a first graphical interface that may be relatively complex in that it may include various media controls, options, and information. The first graphical interface may also occupy a relatively large area of a display screen. The controller may also provide a second graphical interface that may be relatively simple in that it may include fewer controls, options, and/or information than the first graphical interface. Further, the second graphical interface may occupy a relatively small area of the display screen. The first and second graphical interfaces may be configured such that a user may conveniently navigate between the two interfaces to control playback of media using the media playback system.

More specifically, in practice, a user may launch the controller by providing an input at his or her networked computing device. Based on the input, the device may cause a graphical display to provide a first graphical interface of the controller. The first graphical interface may include a first input region and a first representation (e.g., album art, track name, and/or artist name) of a media item that is currently playing at the media playback system. The first graphical interface may include various other input regions (e.g., a playback control region, playback zone region, playback queue region, etc.), and various other representations (e.g., playback zone representations) that provide the user information related to media.

Sometime while the media item (or perhaps a different media item) is playing back at the media playback system, the device may receive an input indicating a selection within the first input region. For example, the user may click on album art displayed within the first input region. Based on the received input, the device may cause the graphical display to provide a second graphical interface of the controller. The second graphical interface may include an active region, an inactive region, and a second representation of the media item. In certain embodiments, one or more of these features may not be present. For example, the active region may occupy the whole space of the second graphical interface such that there is no inactive region. Other examples are also possible. Compared to the first graphical interface, the second graphical interface may include fewer input regions and/or representations. In example implementations, the second graphical interface may appear as album art associated with a media item.

While the second graphical interface is provided, the device may receive an input indicating a selection within the active region. For example, the user may use an input pointer device, such as a computer mouse, to provide an input indicating a hover over (e.g., placement of a cursor) within the active region. Based on the received input, the device may cause the graphical display to provide one or more media playback controls. The one or more media playback controls may be used to control playback of media at the media playback system. In particular, the controls may include a volume control, skip to previous control, skip to next control, play control, pause control, and/or information control. As such, each of the controls may be associated with a respective playback command. Accordingly, the user may use these controls to control playback of media using the media playback system.

In some implementations, while the one or more media playback controls are provided, the control device may receive an input at the second graphical interface that causes the graphical display to modify a second input region of the first graphical display. In particular, the device may receive an input indicating a selection of the information control. Based on the received input, the device may cause the graphical display to provide one or more media-item options within a second input region of the first graphical display. The media-item options may be used to cause the control device to perform a particular function related to a currently playing media item, such as adding the media item to a "favorites list" or to a playlist, among other functions.

At some later time, the user may wish to close the second graphical interface. The user may do so in a conventional manner, such as by selecting a close control (e.g., an "X" icon). Alternatively, according to the present disclosure, the user may perform a selection within the first graphical interface to close the second graphical interface. In particular, the device may receive an input indicating a second selection within the first input region. For example, the user may click on the album art displayed within the first input region for a second time. Based on the received second input, the device may cause the graphical display to no longer provide the second input interface.

As a result of the above processes, the controller may allow the user to control the media playback system using one or both of the two graphical interfaces. At times, the first graphical interface and the second graphical interface may be displayed at the same time. At other times, one graphical interface may be displayed while the other graphical interface may be minimized. In this way, the user may be provided a controller interface but may still have access to the rest of the graphical display of the device to perform other tasks, such as read emails or play a video game. Furthermore, each of the graphical interfaces may be visually different. For example, the first graphical interface may be larger in size than the second graphical interface. Additionally, the first and second graphical interfaces may have one or more common elements. For example, the first and second representations of the media item may be the same.

As discussed in further detail below, a networked computing device may have a controller installed thereon that provides multiple graphical interfaces to a user. As a result of the multiple graphical interfaces, the user may have increased options with respect to how the user controls the media playback system and what is displayed to the user.

As indicated above, the present application involves providing a media playback system controller having multiple graphical interfaces. In one aspect, a method is provided. The method involves: (a) causing a graphical display to provide a first graphical interface comprising (i) a first input region and (ii) a first representation of a media item, (b) receiving a first input data indicating a selection within the first input region, (c) based on the received first input data, causing the graphical display to provide a second graphical interface comprising (i) an active region, (ii) an inactive region, and (iii) a second representation of the media item, (d) receiving a second input data indicating a selection within the active region, and (e) based on the received second input data, causing the graphical display to provide one or more media playback controls.

In another aspect, a device is provided. The device includes a graphical display, a user interface, a non-transitory computer-readable medium, and program instructions stored on the non-transitory computer-readable medium and executable by at least one processor to cause the computing device to: (a) cause the graphical display to provide a first graphical interface comprising (i) a first input region and (ii) a first representation of a media item, (b) receive by the user interface a first input data indicating a selection within the first input region, (c) based on the received first input data, cause the graphical display to provide a second graphical interface comprising (i) an active region, (ii) an inactive region, and (iii) a second representation of the media item, (d) receive by the user interface a second input data indicating a selection within the active region, and (e) based on the received second input data, cause the graphical display to provide one or more media playback controls.

In yet another aspect, a non-transitory computer-readable memory is provided. The non-transitory computer-readable medium having instructions stored thereon that are executable by at least one processor. The instructions include instructions for: (a) causing a graphical display to provide a first graphical interface comprising (i) a first input region and (ii) a first representation of a media item, (b) receiving a first input data indicating a selection within the first input region, (c) based on the received first input data, causing the graphical display to provide a second graphical interface comprising (i) an active region, (ii) an inactive region, and (iii) a second representation of the media item, (d) receiving a second input data indicating a selection within the active region, and (e) based on the received second input data, causing the graphical display to provide one or more media playback controls.

In one other aspect, a method is provided. The method involves: (a) causing a graphical display to provide a first graphical interface comprising (i) a first input region, (ii) a second input region, and (iii) a first representation of a media-item, (b) receiving a first input data indicating a selection within the first input region, (c) based on the received first input data, causing the graphical display to provide a second graphical interface comprising (i) an active region and (ii) a second representation of the media-item, (d) receiving a second input data indicating a selection within the active region, (e) based on the received second input data, causing the graphical display to provide one or more media playback controls, (f) receiving a third input data indicating a selection of one of the one or more media playback controls, and (g) based on the received third input data, causing the graphical display to provide one or more media-item options within the second input region.

In another aspect, a device is provided. The device includes a graphical display, a user interface, a non-transitory computer-readable medium, and program instructions stored on the non-transitory computer-readable medium and executable by at least one processor to cause the computing device to: (a) cause the graphical display to provide a first graphical interface comprising (i) a first input region, (ii) a second input region, and (iii) a first representation of a media-item, (b) receive by the user interface a first input data indicating a selection within the first input region, (c) based on the received first input data, cause the graphical display to provide a second graphical interface comprising (i) an active region and (ii) a second representation of the media-item, (d) receive by the user interface a second input data indicating a selection within the active region, (e) based on the received second input data, cause the graphical display to provide one or more media playback controls, (f) receive by the user interface a third input data indicating a selection of one of the one or more media playback controls, and (g) based on the received third input data, cause the graphical display to provide one or more media-item options within the second input region.

In yet another aspect, a non-transitory computer-readable memory is provided. The non-transitory computer-readable medium having instructions stored thereon that are executable by at least one processor. The instructions include instructions for: (a) causing a graphical display to provide a first graphical interface comprising (i) a first input region, (ii) a second input region, and (iii) a first representation of a media-item, (b) receiving a first input data indicating a selection within the first input region, (c) based on the received first input data, causing the graphical display to provide a second graphical interface comprising (i) an active region and (ii) a second representation of the media-item, (d) receiving a second input data indicating a selection within the active region, (e) based on the received second input data, causing the graphical display to provide one or more media playback controls, (f) receiving a third input data indicating a selection of one of the one or more media playback controls, and (g) based on the received third input data, causing the graphical display to provide one or more media-item options within the second input region.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
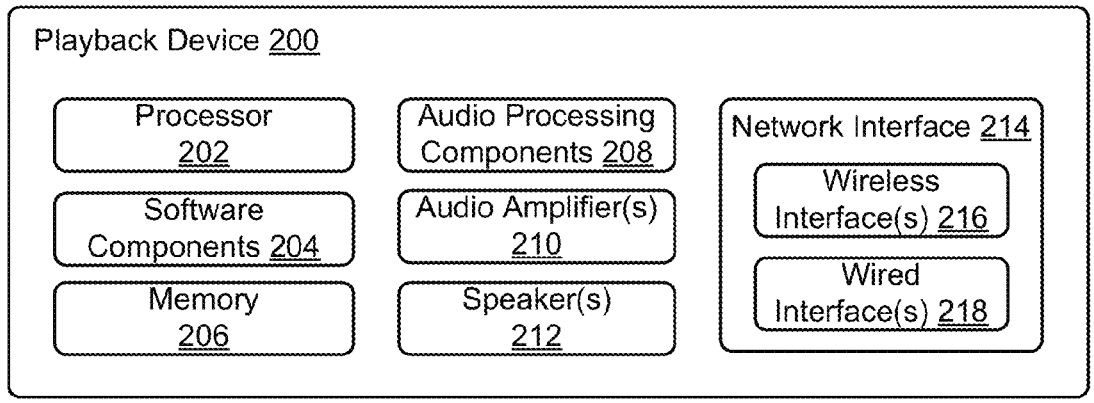
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process selection data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
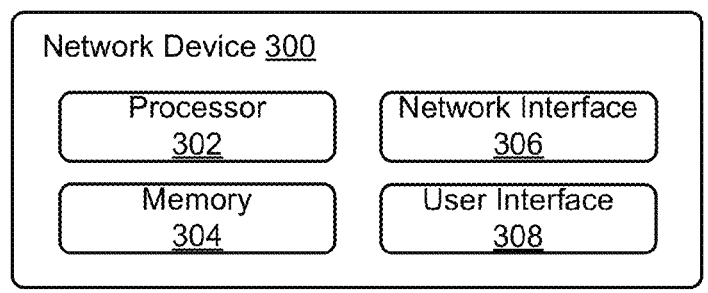
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
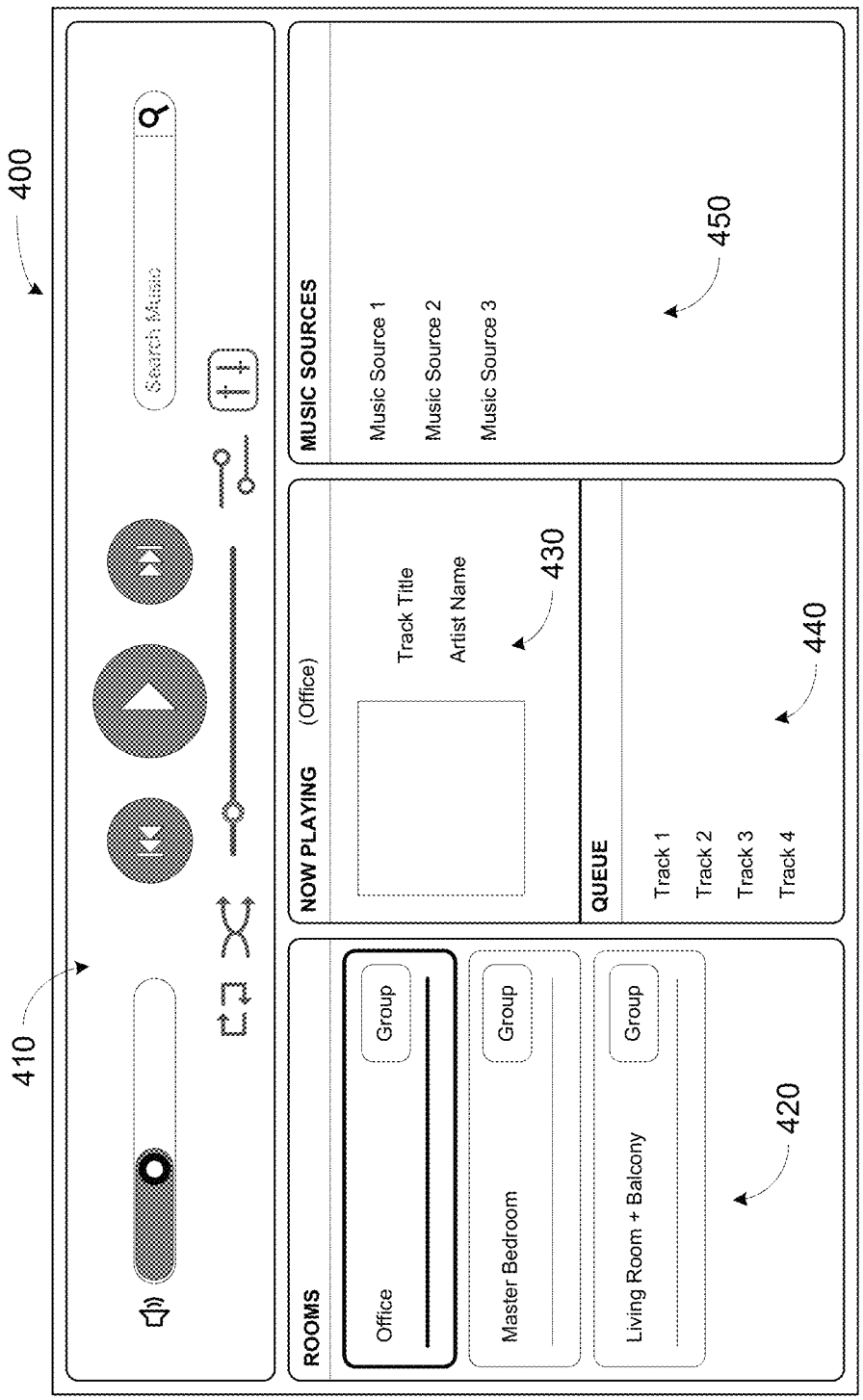
FIG. 4 shows an example controller interface.

The user interface 308 of the control device 300 may be configured to facilitate user access and control of the media playback system 100, by providing a controller interface such as the controller interface 400 shown in FIG. 4. In addition to the controller interface 400, the user interface 308 may provide another controller interface, which is discussed in greater detail below.

The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Methods for Providing a Controller Having Multiple Graphical Interfaces

As discussed above, embodiments described herein may provide a media playback system controller with multiple graphical interfaces.

Figure 5:
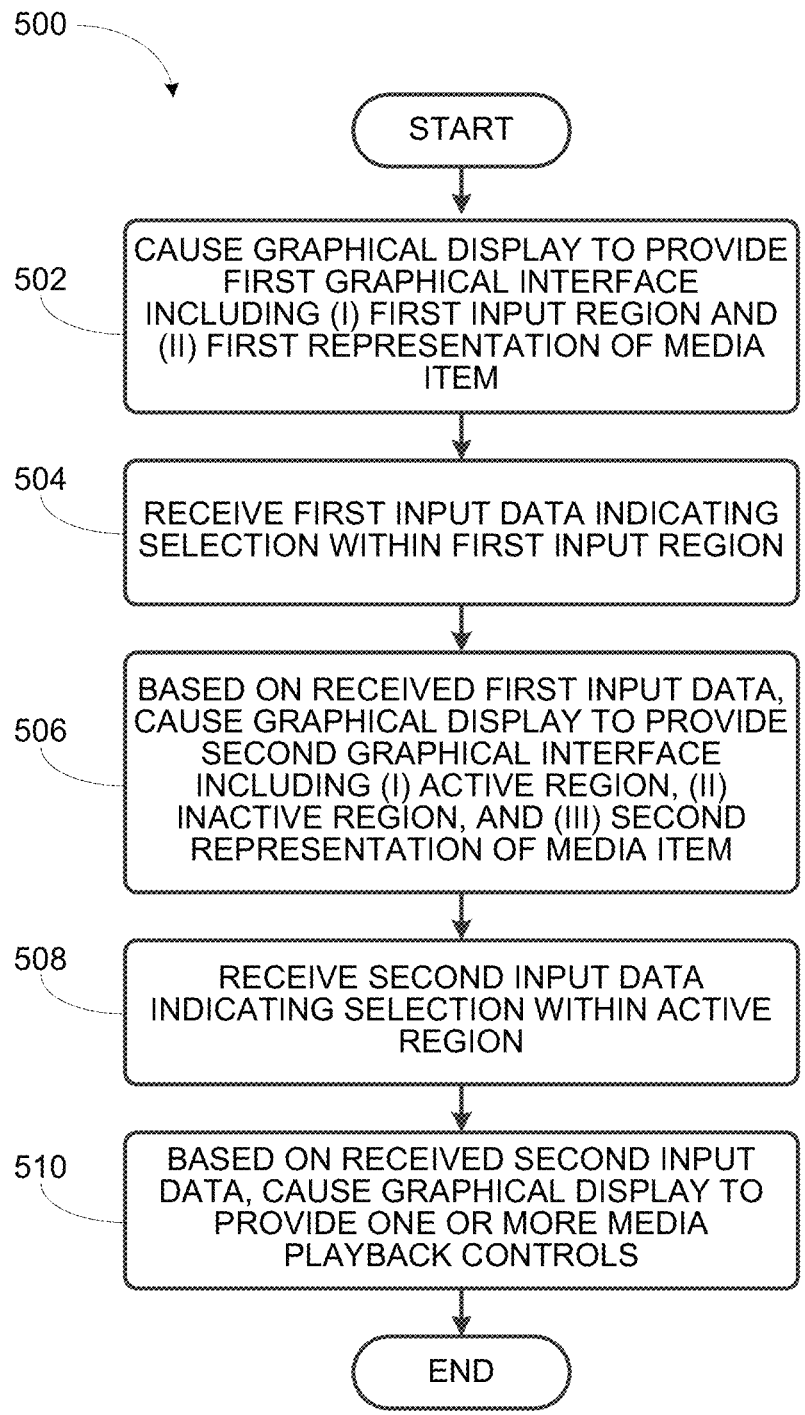
FIG. 5 shows an example flow diagram of an example method.

Method 500 shown in FIG. 5 presents an embodiment of a method that may be implemented within an operating environment involving, for example, the media playback system 100 of FIG. 1. In particular, the method 500 may be performed on a control device of the media playback system 100, such as a networked computing device on which media playback system controller application software may be installed. For example, an iPhone™ iPad™ or any other smart phone, tablet or network device (e.g., a networked computer such as a PC or Mac™). The method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 500 and other processes and methods disclosed herein, each block in FIG. 5 may represent circuitry that is wired to perform the specific logical functions in the process.

For clarity, the method 500 is described herein with reference to FIGS. 6A-6E, each of which depicts an example graphical display as displayed by the control device in accordance with the method 500. It should be understood, however, that this is for purposes of example and explanation only and that the operations of the method 500 are not limited to these figures.

The method 500 begins at block 502 with causing a graphical display to provide a first graphical interface including at least (i) a first input region and (ii) a first representation of a media item. At block 504, the method 500 involves receiving a first input data indicating a selection within the first input region. At block 506, the method 500 involves, based on the received first input data, causing the graphical display to provide a second graphical interface including at least (i) an active region, (ii) an inactive region, and (iii) a second representation of the media item. At block 508, the method 500 involves receiving a second input data indicating a selection within the active region. At block 510, the method 500 involves, based on the received second input data, causing the graphical display to provide one or more media playback controls. Each of the blocks shown in FIG. 5 is discussed in further detail below.

a. Causing Graphical Display to Provide First Graphical Interface

The method 500 begins at block 502 with causing a graphical display to provide a first graphical interface including at least (i) a first input region and (ii) a first representation of a media item. For example, a control device may cause a graphical display of the control device to provide the first graphical interface.

In practice, one or more functions may be performed before the functions of block 502. In particular, one such function may involve the control device downloading or otherwise obtaining media playback system controller application software ("controller"). In turn, the control device may perform one or more installation procedures to install the controller application.

Another function may involve receiving launch input data indicating a command for the control device to launch the controller. For example, as part of the installation process, the control device may have generated an icon corresponding to the controller. Accordingly, the control device may receive an input (e.g., a double-click or double-touch) indicating a selection of the generated icon. The controller application may be launched using other functions as well. The control device causing the graphical display to provide the first graphical interface may be a result of the control device receiving launch input data.

In any event, in accordance with block 502, the control device may ultimately cause the graphical display to provide the first graphical interface. In general, the first graphical interface may be configured to facilitate user access to and control of one or more playback devices of a media playback system. As such, the first graphical interface may include one or more input regions that are configured to detect an indication of a user selection and one or more visual representations that provide to a user information related to media. In example implementations, the first graphical interface may be the same as or similar to the control interface 400 of FIG. 4. For example, the first graphical interface may include an input region similar to the playback zone region 420 as described above. Accordingly, the first graphical interface may include one or more representations of respective playback zones. The first graphical interface may include other of the regions described with reference to FIG. 4.

More generally, the first graphical interface may include a first input region and a first representation of a media item. The first input region may be configured to detect an indication of a selection (e.g., by using a cursor or by way of a touch) within the region. The first input region may be shaped in various manners (e.g., a square, triangle, circle, point, etc.) and may have various sizes.

The first representation of the media item may include any representation of a media item currently playing, previously played, or scheduled to be played, such as a textual and/or graphical representation. For example, the first representation of the media item may include album art (e.g., album art of an album that the media item is associated with) and/or media-item information (e.g., a media-item title, artist/band name, and/or album title). In example implementations, the first input region and the first representation of the media item may overlap. For example, the first representation of the media item or a part thereof may be superimposed on the first input region.

Figure 6A:
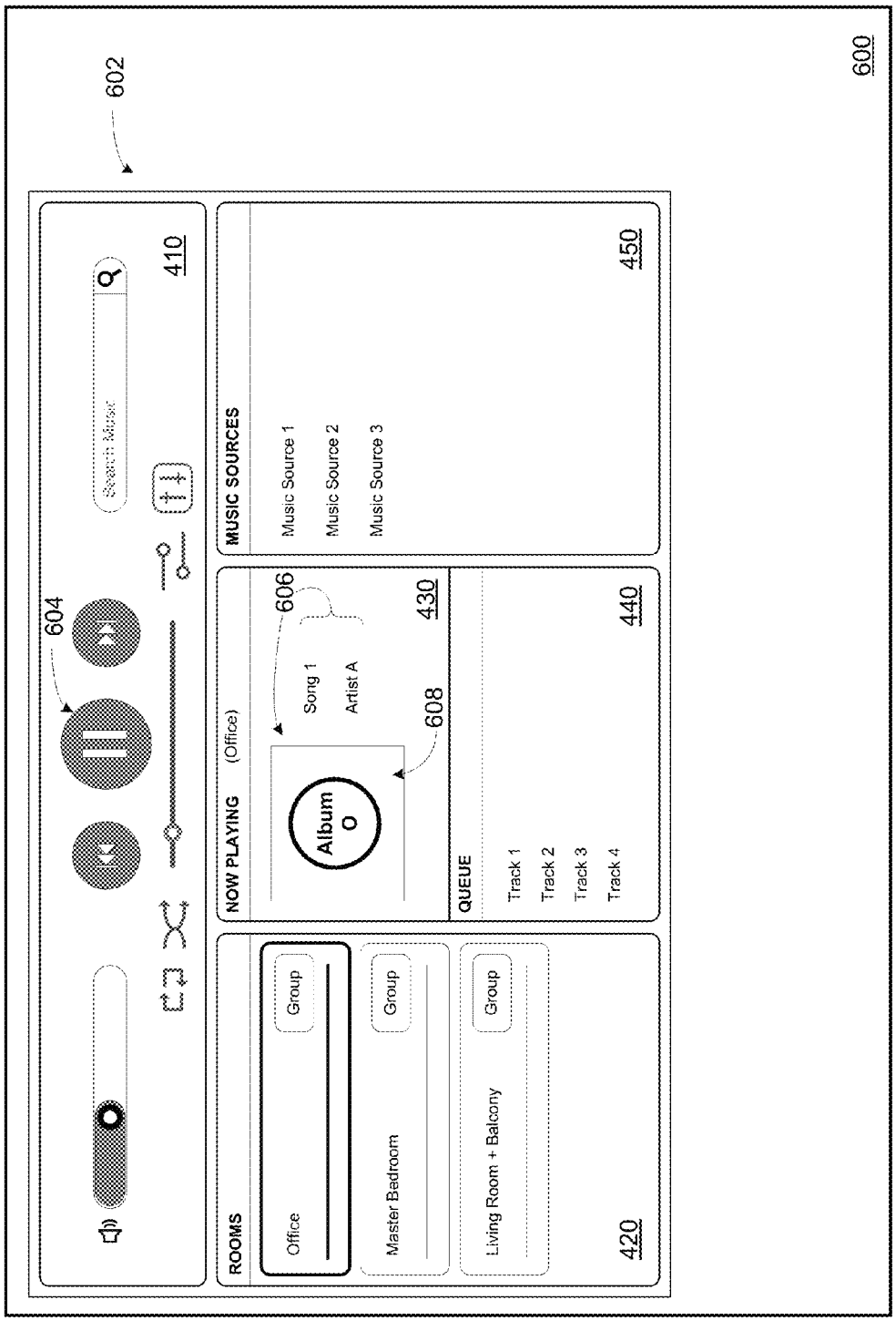
FIGS. 6A-6E show examples of graphical displays according to the example method shown in FIG. 5.

To illustrate, FIG. 6A shows an example graphical display 600 as displayed by the control device in accordance with the method 500. As shown, the graphical display 600 includes a first graphical interface 602 that is similar in some respects to the example control interface 400 of FIG. 4. Unlike in FIG. 4, the first graphical interface 602 illustrates that a media item is currently playing. For example, play-pause control 604 is shown displaying a pause icon indicating that a media item is currently playing, whereas the same icon of FIG. 4 is shown displaying a play icon indicating that a media item is paused. Furthermore, the playback status region 430 is shown as including a first representation of a media item 606. The first representation of the media item 606 includes album art and media-item information (e.g., track title, Song 1, and artist name, Artist A). In this example, a first input region 608 is defined by the space occupied by the album art. In other examples, the first input region 608 may be defined by the space occupied by the "O" of the album art. Other examples are also possible.

b. Receiving First Input Data

Returning back to FIG. 5, at block 504, the method 500 involves receiving a first input data indicating a selection within the first input region. For example, the control device may receive an input indicating a selection within the first input region 608 (e.g., anywhere within the displayed album art). This function may be performed in a number of ways.

For example, this function may involve the control device receiving an indication of one or more cursor clicks or touch inputs within the first input region 608. In other examples, this function may involve the control device receiving an indication of a hover over (e.g., "a mouse over") or the like within the first input region 608. For instance, the first input region 608 may be configured such that a user placing a cursor within the first input region 608 or a finger above the first input region 608 may cause the control device to receive an input indicating a selection. In yet other examples, this function may involve the control device receiving an indication of a hover over or the like for a predefined amount of time. The control device may receive the first input data indicating the selection within the first input region in other ways as well.

c. Causing Graphical Display to Provide Second Graphical Interface

At block 506, the method 500 involves, based on the received first input data, causing the graphical display to provide a second graphical interface including at least (i) an active region, (ii) an inactive region, and (iii) a second representation of the media item. For example, based on the control device receiving the first input, the control device may cause the graphical display to provide the second graphical interface to the user.

As noted above, the second graphical interface may include an active region and an inactive region. The active region may be configured to detect an indication of a selection, whereas the inactive region may not be configured to detect such indications. The active region and the inactive region may be shaped in various respective manners and may have various respective sizes.

Further, the second graphical interface may include a second representation of the media item. In example implementations, the second representation of the media item may be the same as or similar to the first representation of the media item. That is, the first and second representations may include the same or similar content and/or may include the same content arrangements, perhaps with one representation being a different size than the other. In other examples, the first and second representations may be dissimilar. For instance, the first representation of the media item may include media-item information, such as a media item title, artist name, and album title, while the second representation of the media item may include album art. Other examples are possible.

In practice, either or both of the active and inactive regions may overlap with the second representation of the media item. For example, the second representation of the media item or a part thereof may be superimposed on either or both regions. For instance, the second representation may include a graphical representation of an artist name, and a first portion of the artist name may include the active region while a second portion of the artist name may include the inactive region. While the method is described with the second graphical interface including the active region, the inactive region, and the second representation of the media item, it should be understood that the method 500 may be performed when one or more of such features are not present or additional features are provided. For example, in some implementations, the inactive region may not be provided.

Figure 6B:
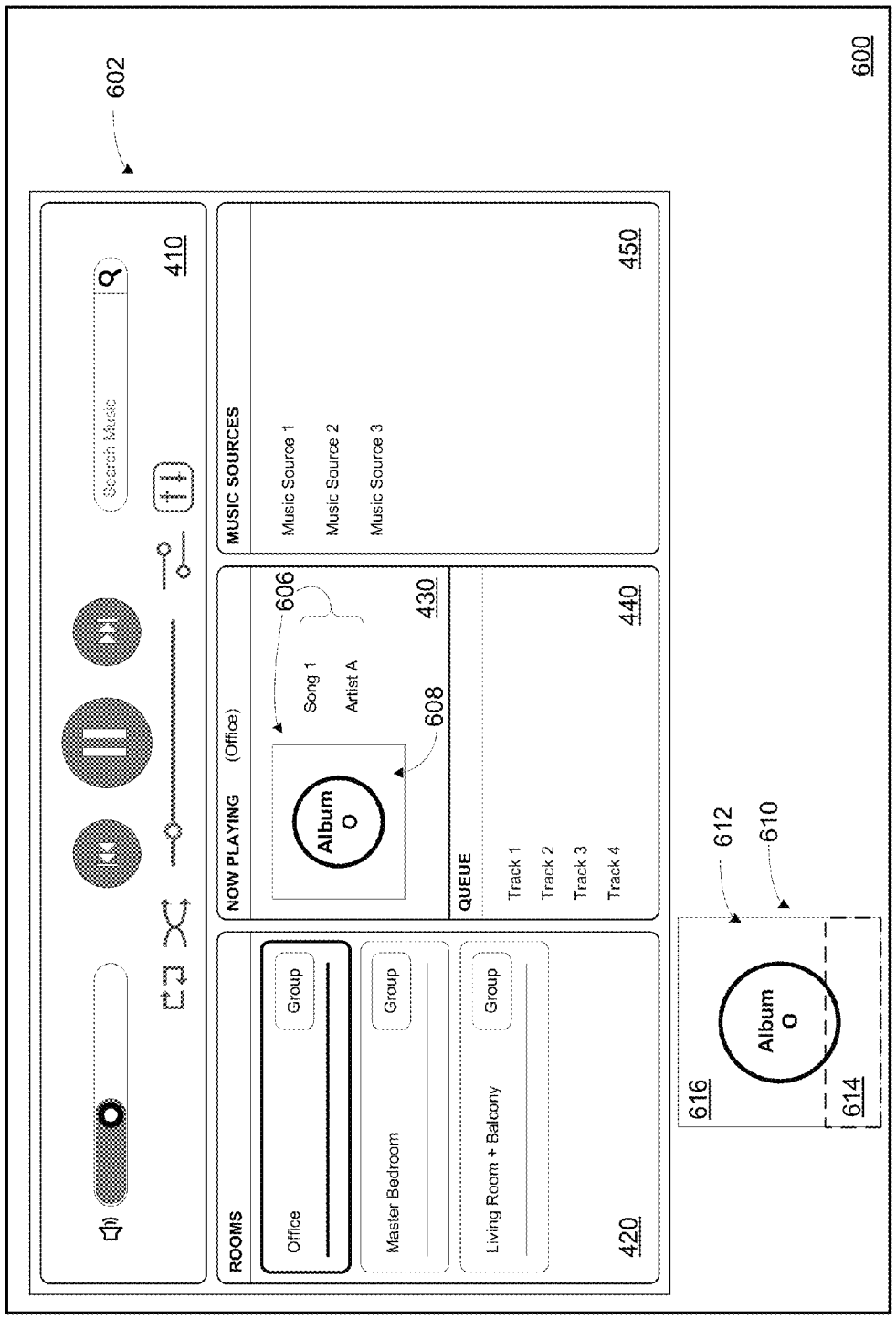

To illustrate, FIG. 6B shows the graphical display 600 as displayed by the control device in accordance with the method 500. In particular, FIG. 6B shows the graphical display 600 simultaneously providing two graphical interfaces. As shown, the graphical display 600 includes the first graphical interface 602 from FIG. 6A and a second graphical interface 610. The second graphical interface 610 includes a second representation of the media item 612 that includes album art. In this example, a bottom portion of the second representation of the media item 612 defines an active region 614 (represented by the dotted lines) and a top portion defines an inactive region 616. As shown, the active region 614 includes a first size and a first shape (e.g., a rectangle). In other examples, the active region 614 and the inactive region 616 may have different respective sizes and/or shapes.

Figure 6C:
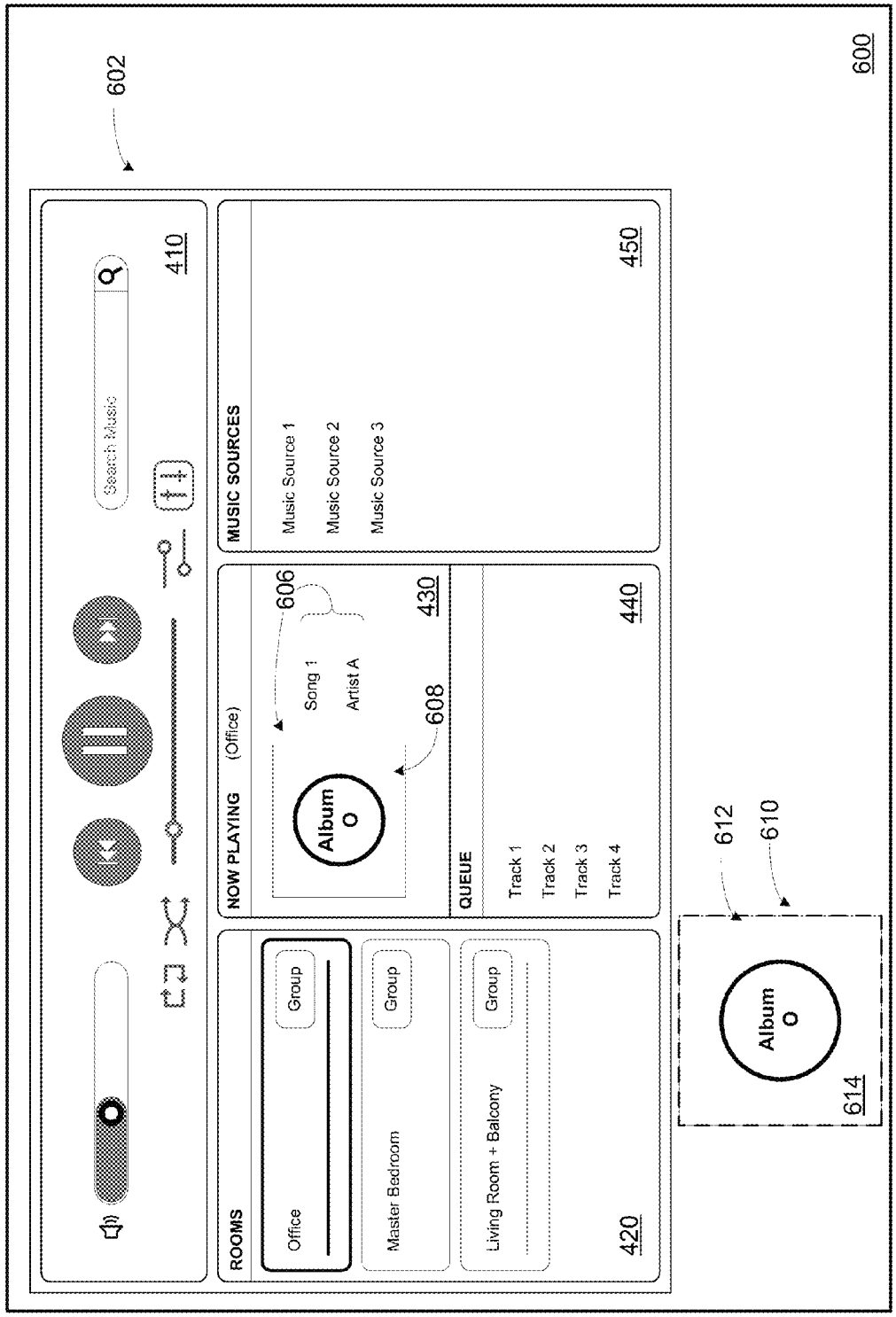

FIG. 6C shows another example of the graphical display 600 as displayed by the control device. FIG. 6C is similar in some respects to FIG. 6B. However, as shown in FIG. 6C, the active region 614 occupies the same space as the second representation of the media item 612. That is, the whole space occupied by the album art may be configured to detect an indication of a selection. Accordingly, in some implementations, the second graphical interface 610 may not include an inactive region.

The second graphical interface 610 may include other aspects as well. For example, the second graphical interface 610 may include a selectable aspect that allows a user to resize the second graphical interface 610. Additionally or alternatively, the second graphical interface 610 may include a selectable aspect that allows a user to close or minimize the second graphical interface 610. Other additional aspects are also possible.

d. Receiving Second Input Data

Returning again to FIG. 5, at block 508, the method 500 involves receiving a second input data indicating a selection within the active region. For example, the control device may receive an input indicating a selection within the active region 614 (e.g., anywhere within the dotted portion of the album art). This function may be performed in a similar manner as the input function described above with respect to block 504.

In example implementations, the control device may receive the second input data based on a different selection type than that which caused the control device to receive the first input data. For example, the control device receiving the first input data may have involved the control device receiving a cursor click within the album art of the first graphical interface 602 and the control device receiving the second input data may involve the control device receiving a mouse over within the album art of the second graphical interface 610. Alternatively, the first and second input data may involve the control device receiving indications of the same selection type. Other examples are possible.

In practice, the control device receiving the input indicating the selection within the active region 614 may involve the control device receiving an indication of an input movement from the inactive region 616 to the active region 614. For example, a user may be interacting with the second representation of the media item 612 somewhere in the inactive region 616, for instance, by moving a cursor about the inactive region 612. At some point, the user may move the cursor from the inactive region 616 to the active region 614. In this respect, the second graphical interface may be configured to allow a user to navigate within particular areas of the second graphical interface without causing the control device to receive an indication of a selection.

e. Causing Graphical Display to Provide One or More Media Playback Controls

At block 510, the method 500 involves, based on the received second input data, causing the graphical display to provide one or more media playback controls. For example, based on the control device receiving the second input, the control device may cause the graphical display to provide the one or more media playback controls.

The media playback controls may be configured to facilitate user access to and control of one or more playback devices of a media playback system. In example implementations, the media playback controls may be configured to cause the control device to control one or more playback devices in a particular playback zone or zone group. For example, the media playback controls may correspond to a playback zone or zone group that is selected within the playback zone region 420.

The one or more media playback controls may be provided in a number of ways. In one example, the one or more media playback controls may include selectable icons similar to those discussed above with reference to the playback control region 410. The one or more media playback controls may also include controls other than those discussed above. For example, the one or more media playback controls may include an information control that may be configured to, upon selection, cause the graphical display to provide one or more media-item options within a region (e.g., the audio content sources region 450) of the first graphical interface 602. Other additional controls are also possible.

The control device may cause the graphical display to provide the one or more media playback controls in a number of areas within the graphical display. For example, the media playback controls may be provided wholly or partially within the active region 614. In other examples, the one or more media playback controls may be provided wholly or partially within the inactive region 616 and thereby may cause the area occupied by the media playback controls to no longer be inactive. In another example, the one or more media playback controls may be provided partially within each of the active and inactive regions 614, 616. In yet other examples, the one or more media playback controls may be provided in a third graphical interface, for example, somewhere outside of the first and second graphical displays. Other examples are also possible.

In example implementations, when the control device causes the graphical display to provide the one or more media playback controls, the control device may also adjust the active region. For example, when the second graphical interface is first provided, the active region may have a first size and/or shape, and when the playback controls are provided, the active region may be adjusted such that it has a second size and/or shape different from the first size and/or shape. The second size may be larger or smaller than the first size. In such implementations, the playback controls may be provided within the adjusted active region.

Figure 6D:
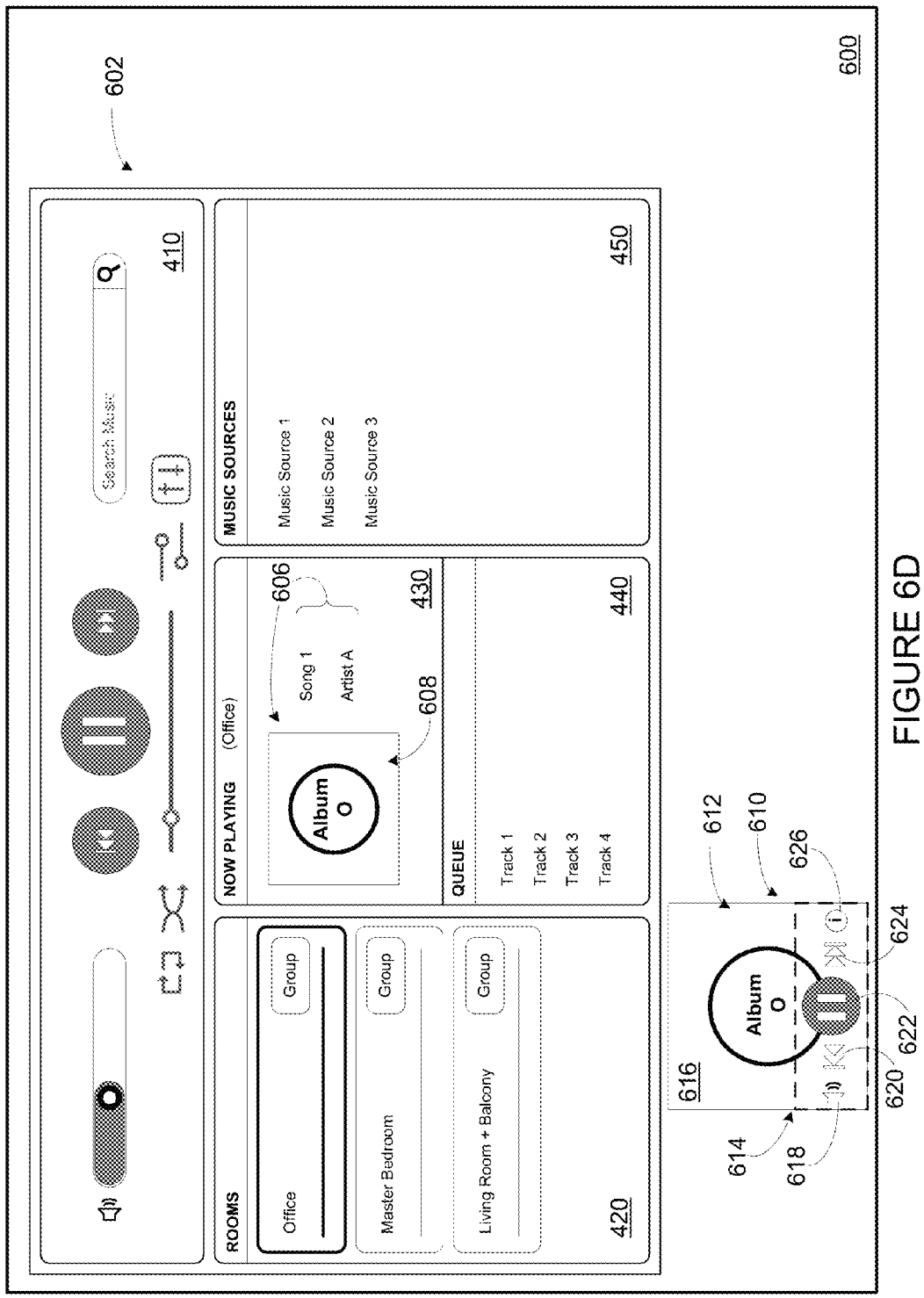

To illustrate, FIG. 6D shows the graphical display 600 as displayed by the control device in accordance with the method 500. In particular, FIG. 6D shows the graphical display 600 providing media playback controls. As shown, the graphical display 600 includes the first graphical interface 602 and the second graphical interface 610 from FIG. 6B. However, the active region 614 is shown having a second size that is larger than the first size as shown in FIG. 6B. Further, the second graphical interface 610 is now shown with media playback controls 618-626 within the active region 614.

Each of the media playback controls 618-626 may be associated with a respective playback command. That is, each media playback control may be used to cause a particular function to be performed related to a media item. For example, the media playback control 618 may correspond to a volume control that may be used to modify an output volume of a playback device, zone, or zone group. The media playback control 620 may correspond to a skip to previous control that may be used to return to a previously played media item. The media playback control 622 may correspond to a play-pause control that may be used to output a media item or to stop the output of a media item. The media playback control 624 may correspond to a skip to next control that may be used to proceed to a media item that is scheduled to be played after the present media item. The media playback control 626 may correspond to an information control that may be used to provide one or more media-item options within a region of the first graphical interface 602. It should be understood that the one or more media playback controls may include additional or fewer controls and that the FIG. 6D is but one example illustration of such controls and should not be construed as limiting.

Notably, FIG. 6D shows the graphical display 600 providing two different sets of media playback controls (e.g., in the playback control region 410 and in the second graphical interface 610). In this respect, the controller may allow the user to control a media playback system using one or both of the two sets of media playback controls. At times, the first graphical interface and the second graphical interface may be displayed at the same time. At other times, one graphical interface may be displayed (e.g., the second graphical interface 610) while the other graphical interface may be minimized. In this way, the user may be provided a controller interface but may still have access to the rest of the graphical display 600 of the device to perform other tasks, such as read emails or play a video game.

IV. Additional Functions

Additional functions may be carried out with or in addition to the method 500. It should be understood that the below discussed functions are not necessary to perform the method 500.

One such function may involve the control device receiving input data indicating a selection of one of the one or more media playback controls. For example, the control device may receive an input indicating a selection of one of the media playback controls 618-626. The selection may be performed in a number of manners as discussed above with reference to blocks 504 and 508.

Based on the received input data, the control device may transmit to a playback device, zone, or zone group the respective playback command associated with the selected media playback control. For example, the command might be to play, pause, or mute a media item, among other possible commands.

Another additional function may involve the control device, based on receiving input data indicating a selection of one of the one or more media playback controls, causing the graphical display to provide one or more media-item options within a second input region of the first graphical interface. In example implementations, such input data may indicate a selection of the information control 626.

The one or more media-item options may be provided by way of a graphical and/or textual representation, which may also be selectable. Upon being selected, a media-item option may cause the control device to perform a particular function related to a currently playing media item. For example, such a function may involve adding or removing the media item to or from a media playback system specific "favorites list", adding or removing the media item to or from a media service specific "favorites list" (e.g., a list of favorite media items provided by a streaming audio service provider), adding or removing the media item to or from a media playback system specific playlist, adding or removing the media item to or from a media service specific playlist, and displaying media-item information associated with the media item, such as artist and/or album information. Other example functions related to a currently playing media item are also possible.

Figure 6E:
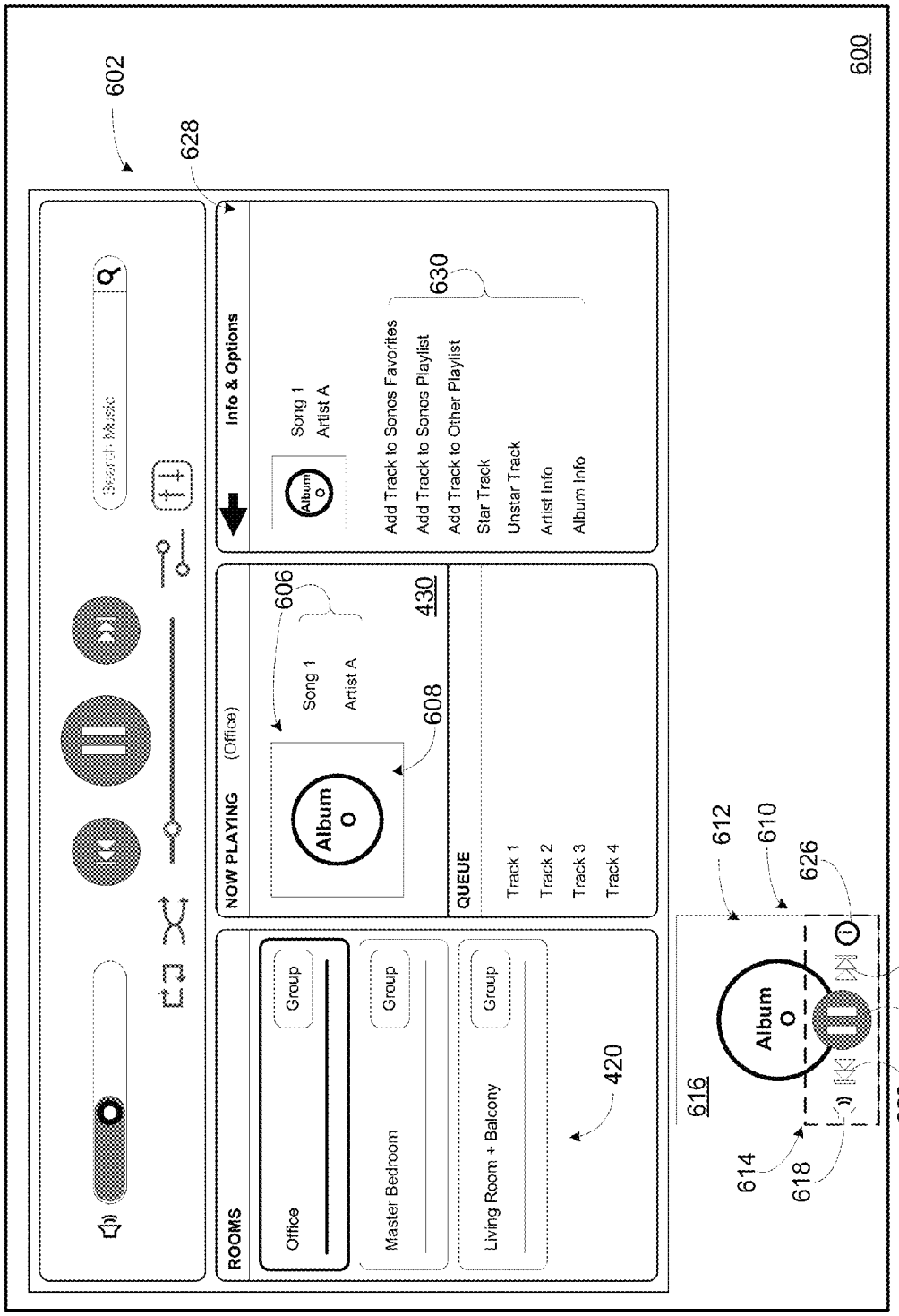

To illustrate, FIG. 6E shows the graphical display 600 as displayed by the control device in accordance with the method 500. In particular, FIG. 6E shows the graphical display 600 providing media-item options based on a selection of the information control 626. As shown, the first graphical interface 602 now displays within a second input region 628 (e.g., the region that was previously the audio content sources region 450) one or more media-item options 630. Each of the one or more media-item options 630 include a textual representation and are selectable. As shown, the one or more media-item options 630 include multiple add media-item to favorites list options, multiple add media-item to playlist options, and multiple display media-item information options (e.g., a display artist information option and a display album information option).

Other additional functions may involve, while causing the graphical display to provide one or more media playback controls, receiving input data indicating an input movement from the active region to the inactive region or from the active region to outside of the second graphical interface. And based on the received input data, causing the graphical display to no longer provide the one or more media playback controls. For instance, the media playback controls may have been provided as a result of a user placing a cursor within the active region 614. The user may then move the cursor from the active region 614 to the inactive region 616, or perhaps outside of the second graphical interface 610, and this movement may cause the media playback controls to disappear. Further, in certain implementations, based on such received input data, the size of the active region may change once again. For example, the active region 614 with the second size as shown in FIG. 6D may be adjusted back to the first size as shown in FIG. 6B. Other examples are also possible.

Another additional function may involve the control device receiving input data indicating a second selection within the first input region. For example, the control device may receive an input indicating a second selection within the first input region 608 defined by the album art. Based on the received input data, the control device may cause the graphical display 600 to no longer provide the second input interface 610. In this regard, the second graphical interface 610 may be closed in response to an input at the first graphical interface 602. Other additional functions may be performed as well.

An additional function may involve, while the first graphical interface is minimized and the second graphical interface is provided, receiving an input data indicating a selection of a close control (e.g., an "X" icon or the like) of the second graphical interface. Based on the received second input data, causing the graphical display to maximize the first graphical interface and no longer provide the second graphical interface. In this way, an input at one graphical interface may cause a result at the other graphical interface. Other additional functions are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves providing a media playback system controller having multiple graphical interfaces. In one aspect, a method is provided. The method involves: (a) causing a graphical display to provide a first graphical interface comprising (i) a first input region and (ii) a first representation of a media item, (b) receiving a first input data indicating a selection within the first input region, (c) based on the received first input data, causing the graphical display to provide a second graphical interface comprising (i) an active region, (ii) an inactive region, and (iii) a second representation of the media item, (d) receiving a second input data indicating a selection within the active region, and (e) based on the received second input data, causing the graphical display to provide one or more media playback controls.

In another aspect, a device is provided. The device includes a graphical display, a user interface, a non-transitory computer-readable medium, and program instructions stored on the non-transitory computer-readable medium and executable by at least one processor to cause the computing device to: (a) cause the graphical display to provide a first graphical interface comprising (i) a first input region and (ii) a first representation of a media item, (b) receive by the user interface a first input data indicating a selection within the first input region, (c) based on the received first input data, cause the graphical display to provide a second graphical interface comprising (i) an active region, (ii) an inactive region, and (iii) a second representation of the media item, (d) receive by the user interface a second input data indicating a selection within the active region, and (e) based on the received second input data, cause the graphical display to provide one or more media playback controls.

In yet another aspect, a non-transitory computer-readable memory is provided. The non-transitory computer-readable medium having instructions stored thereon that are executable by at least one processor. The instructions include instructions for: (a) causing a graphical display to provide a first graphical interface comprising (i) a first input region and (ii) a first representation of a media item, (b) receiving a first input data indicating a selection within the first input region, (c) based on the received first input data, causing the graphical display to provide a second graphical interface comprising (i) an active region, (ii) an inactive region, and (iii) a second representation of the media item, (d) receiving a second input data indicating a selection within the active region, and (e) based on the received second input data, causing the graphical display to provide one or more media playback controls.

In one other aspect, a method is provided. The method involves: (a) causing a graphical display to provide a first graphical interface comprising (i) a first input region, (ii) a second input region, and (iii) a first representation of a media-item, (b) receiving a first input data indicating a selection within the first input region, (c) based on the received first input data, causing the graphical display to provide a second graphical interface comprising (i) an active region and (ii) a second representation of the media-item, (d) receiving a second input data indicating a selection within the active region, (e) based on the received second input data, causing the graphical display to provide one or more media playback controls, (f) receiving a third input data indicating a selection of one of the one or more media playback controls, and (g) based on the received third input data, causing the graphical display to provide one or more media-item options within the second input region.

In another aspect, a device is provided. The device includes a graphical display, a user interface, a non-transitory computer-readable medium, and program instructions stored on the non-transitory computer-readable medium and executable by at least one processor to cause the computing device to: (a) cause the graphical display to provide a first graphical interface comprising (i) a first input region, (ii) a second input region, and (iii) a first representation of a media-item, (b) receive by the user interface a first input data indicating a selection within the first input region, (c) based on the received first input data, cause the graphical display to provide a second graphical interface comprising (i) an active region and (ii) a second representation of the media-item, (d) receive by the user interface a second input data indicating a selection within the active region, (e) based on the received second input data, cause the graphical display to provide one or more media playback controls, (f) receive by the user interface a third input data indicating a selection of one of the one or more media playback controls, and (g) based on the received third input data, cause the graphical display to provide one or more media-item options within the second input region.

In yet another aspect, a non-transitory computer-readable memory is provided. The non-transitory computer-readable medium having instructions stored thereon that are executable by at least one processor. The instructions include instructions for: (a) causing a graphical display to provide a first graphical interface comprising (i) a first input region, (ii) a second input region, and (iii) a first representation of a media-item, (b) receiving a first input data indicating a selection within the first input region, (c) based on the received first input data, causing the graphical display to provide a second graphical interface comprising (i) an active region and (ii) a second representation of the media-item, (d) receiving a second input data indicating a selection within the active region, (e) based on the received second input data, causing the graphical display to provide one or more media playback controls, (f) receiving a third input data indicating a selection of one of the one or more media playback controls, and (g) based on the received third input data, causing the graphical display to provide one or more media-item options within the second input region.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method comprising:

causing, via a computing device, a graphical display to provide a first graphical interface within a display region of the graphical display, wherein the first graphical interface comprises (i) a first input region and (ii) a first representation of a media item;

receiving a first input data indicating a selection within the first input region;

based on the received first input data, causing the graphical display to provide a second graphical interface within the display region of the graphical display at the same time as the first graphical interface, wherein the second graphical interface comprises (i) an active region, and (ii) a second representation of the media item, and wherein the second graphical interface within the display region is distinct from the first graphical interface within the display region;

receiving a second input data indicating a selection within the active region; and based on the received second input data, causing the second graphical interface to display one or more media playback controls to control playback of the
media item on one or more playback devices that are
distinct from the computing device.

2. The method of claim 1, wherein receiving the second input data indicating the selection within the active region comprises receiving a representation of a hover over within the active region.

3. The method of claim 1, wherein receiving the second input data indicating the selection within the active region comprises receiving an indication of an input movement to the active region.

4. The method of claim 1, wherein the active region comprises a first size, the method further comprising, based on the received second input data, adjusting the active region to have a second size different from the first size.

5. The method of claim 4, wherein the second size is larger than the first size.

6. The method of claim 1, wherein the one or more media playback controls comprise at least one of a volume control, a skip to previous control, a skip to next control, a play control, a pause control, or an information control.

7. The method of claim 6, further comprising:
receiving a third input data indicating a selection of the information control; and
based on the received third input data, causing the graphical display to provide one or more media-item options within the display region of the graphical display.

8. The method of claim 1, further comprising:
while the graphical display is providing the second graphical interface within the display region of the graphical display at the same time as the first graphical interface, receiving data indicating a command to minimize the first graphical interface; and
based on receiving the data indicating the command to minimize the first graphical interface, causing the graphical display to provide the second graphical interface while the first graphical interface is minimized.

9. The method of claim 1, further comprising:
after causing the graphical display to provide the second graphical interface, receiving a third input data indicating a second selection within the second graphical interface; and
based on the received third input data, causing the graphical display to remove the second graphical interface from the display region of the graphical display.

10. The method of claim 1, further comprising:
receiving a third input data indicating a selection of one of the one or more media playback controls, wherein the one or more media playback controls are each associated with a respective playback command; and
based on the received third input data, transmitting to a playback device the respective playback command associated with the selected one of the one or more media playback controls.

11. The method of claim 10, further comprising:
causing the graphical display to provide a representation of a playback zone within the display region of the graphical display, and wherein the playback zone comprises the playback device.

12. The method of claim 7, wherein the one or more media-item options comprise at least one of an add media-item to favorites list option, an add media-item to playlist option, or a display media-item information option.

13. The method of claim 12, wherein the display media-item information options comprises at least one of a display artist information option or a display album information option.

14. Tangible, non-transitory, computer-readable media having instructions stored thereon, wherein the instructions, when executed by at least one processor, cause a computing device to perform a method comprising:
causing a graphical display to provide a first graphical interface within a display region of the graphical display, wherein the first graphical interface comprises (i) a first input region and (ii) a first representation of a media item;
receiving a first input data indicating a selection within the first input region;
based on the received first input data, causing the graphical display to provide a second graphical interface within the display region of the graphical display at the same time as the first graphical interface, wherein the second graphical interface comprises (i) an active region, and (ii) a second representation of the media item, and wherein the second graphical interface within the display region is distinct from the first graphical interface within the display region;
receiving a second input data indicating a selection within the active region; and
based on the received second input data, causing the second graphical interface to display one or more media playback controls to control playback of the media item on one or more playback devices that are distinct from the computing device.

15. The tangible, non-transitory, computer-readable media of claim 14, wherein receiving the second input data indicating the selection within the active region comprises receiving an indication of an input movement to the active region.

16. The tangible, non-transitory, computer-readable media of claim 14, wherein the active region comprises a first size, the method further comprising:
based on the received second input data, adjusting the active region to have a second size different from the first size.

17. The tangible, non-transitory, computer-readable media of claim 16, wherein the second size is larger than the first size.

18. The tangible, non-transitory, computer-readable media of claim 14, the instructions further comprising:
after causing the graphical display to provide the second graphical interface, receiving a third input data indicating a second selection within the second graphical interface; and
based on the received third input data, causing the graphical display to remove the second graphical interface from the display region of the graphical display.

19. The tangible, non-transitory, computer-readable media of claim 14, wherein the first graphical interface further comprises an indication that the media item is currently playing.

20. A computing device comprising:
a network interface;
a display;
one or more processors; and
computer-readable media having instructions stored therein, wherein the instructions, when executed by the one or more processors, cause the computing device to perform functions comprising:
causing the display to provide a first graphical interface within a display region of the display, wherein the first graphical interface comprises (i) a first input region and (ii) a first representation of a media item;

receiving a first input data indicating a selection within the first input region;

based on the received first input data, causing the display to provide a second graphical interface within the display region of the display at the same time as the first graphical interface, wherein the second graphical interface comprises (i) an active region, and (ii) a second representation of the media item, and wherein the second graphical interface within the display region is distinct from the first graphical interface within the display region;

receiving a second input data indicating a selection within the active region; and based on the received second input data, causing the second graphical interface to provide one or more media playback controls to control playback of the media item on one or more playback devices that are distinct from the computing device.

21. The tangible, non-transitory, computer-readable media of claim 14, wherein the method further comprises:

while the graphical display is providing the second graphical interface within the display region of the graphical display at the same time as the first graphical interface, receiving data indicating a command to minimize the first graphical interface; and based on receiving the data indicating the command to minimize the first graphical interface, causing the graphical display to provide the second graphical interface while the first graphical interface is minimized.

22. The computing device of claim 20, wherein the functions further comprise:

while the graphical display is providing the second graphical interface within the display region of the graphical display at the same time as the first graphical interface, receiving data indicating a command to minimize the first graphical interface; and based on receiving the data indicating the command to minimize the first graphical interface, causing the graphical display to provide the second graphical interface while the first graphical interface is minimized.

* * * * *